(12) United States Patent
Yamamoto et al.

(10) Patent No.: US 8,520,612 B2
(45) Date of Patent: Aug. 27, 2013

(54) METHOD FOR RADIO RESOURCE CONTROL AND BASE STATION USING THE SAME

(75) Inventors: Tomonori Yamamoto, Kokubunji (JP); Rintaro Katayama, Tachikawa (JP); Keisuke Takeuchi, Yokohama (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 718 days.

(21) Appl. No.: 12/707,758

(22) Filed: Feb. 18, 2010

(65) Prior Publication Data

US 2010/0238876 A1 Sep. 23, 2010

(30) Foreign Application Priority Data

Mar. 18, 2009 (JP) .................................. 2009-066074

(51) Int. Cl.
*H04W 4/00* (2009.01)

(52) U.S. Cl.
USPC ........... 370/329; 370/330; 370/341; 370/431; 370/436; 370/468

(58) Field of Classification Search
USPC ................. 370/329, 330, 341, 431, 436, 468; 455/450–522
See application file for complete search history.

(56) References Cited

U.S. PATENT DOCUMENTS

| | | | |
|---|---|---|---|
| 6,223,041 B1 * | 4/2001 | Egner et al. ................ | 455/452.2 |
| 6,240,094 B1 * | 5/2001 | Schneider ...................... | 370/412 |
| 8,306,544 B2 * | 11/2012 | Ishii et al. ..................... | 455/450 |
| 2003/0169708 A1 * | 9/2003 | Harris ........................... | 370/335 |
| 2005/0186983 A1 * | 8/2005 | Iochi ............................ | 455/522 |
| 2007/0086406 A1 | 4/2007 | Papasakellariou | |
| 2007/0142067 A1 * | 6/2007 | Cheng et al. .................. | 455/512 |
| 2009/0175369 A1 | 7/2009 | Atarashi et al. | |
| 2009/0186621 A1 * | 7/2009 | Umeda et al. ................. | 455/446 |

FOREIGN PATENT DOCUMENTS

| | | |
|---|---|---|
| EP | 1 519 498 A1 | 3/2005 |
| EP | 1 983 783 | 10/2008 |
| EP | 1 983 783 A1 | 10/2008 |
| JP | 2004-173017 A | 6/2004 |
| WO | WO 2008105416 A1 * | 9/2008 |

OTHER PUBLICATIONS

JP Office Action in JP Applicatoin No. 201010117822.X, dated Sep. 3, 2012.

* cited by examiner

*Primary Examiner* — Mark Rinehart
*Assistant Examiner* — Mang Yeung
(74) *Attorney, Agent, or Firm* — Mattingly & Malur, PC

(57) ABSTRACT

A method for radio resource control is carried out in a radio communications system including multiple base stations. In this method, a radio resource that can be used by the base stations is divided into multiple first radio resources on the frequency axis. Then one or more of the first radio resources are allocated to a second radio resource for initially transmitting a packet and the other first radio resources are allocated to a third radio resource for retransmitting the packet.

10 Claims, 7 Drawing Sheets

METHOD FOR RADIO RESOURCE CONTROL AND BASE STATION USING THE SAME

CLAIM OF PRIORITY

The present application claims priority from Japanese patent application JP 2009-066074 filed on Mar. 18, 2009, the content of which is hereby incorporated by reference into this application.

FIELD OF THE INVENTION

The present invention relates to methods for dividing radio resources and in particular to a technology for allocating frequency and power for the reduction of interference between base stations.

BACKGROUND OF THE INVENTION

In recent years, the demand for broadband and high-speed communication services has grown and the development of radio communications systems is being advanced to implement these communication services. Examples of broadband and high-speed communication services include best-effort data communication, VoIP voice communication, streaming delivery of image contents, and the like.

A cellular radio communications system of the third generation using CDMA (Code Division Multiple Access) is capable of providing users with multimedia information through an IP network.

A cellular radio communications system using OFDM (Orthogonal Frequency Division Multiplexing) has attracted attention as a next-generation CDMA radio communications system. OFDMA is a technology in which multiple orthogonal carrier waves are subjected to quadrature modulation on a frequency axis to enhance the utilization efficiency of frequency.

The cellular radio communications system using OFDMA is a cellular radio communications system of the 3.9 generation. Typical standards of OFDMA are LTE (Long Term Evolution) and UMB (Ultra Mobile Broadband). These standards are respectively internationally set by the 3GPP (3rd Generation Partnership Project) and the 3GPP2.

It is known that the cellular radio communications system using OFDMA is more susceptible to interference power from an adjacent base station than the cellular radio communications system using CDMA is. For this reason, with respect to the cellular radio communications system using OFDMA, it is difficult to work out a design for the disposition of base stations. Especially, at the end of the cell (cell edge) of a relevant base station, the power level of a radio signal transmitted from the relevant base station and the power level of interference power from an adjacent base station get close to each other. This causes a problem of markedly degraded SINR (Signal to Interference and Noise power Ratio), which is an index indicating channel quality.

To solve this problem, it is advisable to adopt FFR (Fractional Frequency Reuse) in a cellular radio communications system. FFR is a technology for allocating different frequency bands for which high power is set to a mobile station positioned at the cell edge of some base station and a mobile station positioned at the cell edge of another base station adjoining thereto. According to FFR, a cellular radio communications system can reduce the influence of interference power from an adjacent cell on a mobile station positioned at each cell edge.

FIG. 2A is an explanatory drawing illustrating an overview of a conventional non-FFR cellular radio communications system.

The cellular radio communications system that does not adopt the FFR transmits radio signals by identical power using the full band (f0) of a frequency resource. For this reason, it is possible to schedule the transmission and reception of radio signals using an identical frequency band with respect both to the central portion of a cell (cell center) and the cell edge. However, a mobile station positioned at the cell edge of a base station 201 is largely influenced by the interference power of a radio signal transmitted from another base station 201 adjoining thereto.

Consequently, it was proposed to adopt the FFR in a cellular radio communications system.

FIG. 2B is an explanatory drawing illustrating an overview of a conventional FFR cellular radio communications system.

The cellular radio communications system that adopts the FFR divides a frequency band (f0) in which radio signals are to be transmitted into multiple frequency bands and sets powers different in magnitude for the divided frequency bands (for example, f1, f2, f3). The cellular radio communications system varies the combination of the divided frequency bands f1, f2, f3 and powers set for the frequency bands f1, f2, f3 on a base station 201-by-base station 201 basis. The cellular radio communications system can thereby reduce interference power a mobile station positioned at the cell edge of a base station 201 receives from an adjacent cell.

FIG. 2C is an explanatory drawing illustrating frequency bands in conventional FFR.

The frequency band (f0) in which radio signals are to be transmitted is divided into multiple frequency bands (for example, f1, f2, f3).

One of technologies for accelerating data communication is HARQ (Hybrid Automatic Repeat reQuest). HARQ is a technology for retransmitting packets implemented in the physical layer and the MAC (Media Access Control) layer. HARQ is superior to other retransmission technologies implemented in the RLC (Radio Link Control) layer. In HARQ, there are two synthesis methods, IR (Incremental Redundancy) and CC (Chase Combining).

In CC, the transmitting side transmits a packet more than once and the receiving side synthesizes data contained in the packets for the multiple times. According to CC, power (reception level) is enhanced as the number of times of retransmission is increased; therefore, the probability of success in decoding data is increased.

In IR, meanwhile, the transmitting side retransmits packets containing an error correcting code more than once; and the receiving side decodes data contained in the packets using each error correcting code contained in the received packets for the multiple times. According to IR, the following takes place as the number of times of retransmission is increased: in addition to the power synthesis effect which is an effect of CC, the redundancy bits of the error correcting codes used by the receiving side to decode data are increased. Therefore, the probability of success in decoding data is increased. Both in IR and in CC, therefore, the following takes place when the number of times of packet retransmission is increased: the probability of success in decoding data on the receiving side is increased and thus the probability of transmission success (ACK) is increased.

FIG. 3 is an explanatory drawing illustrating an overview of conventional HARQ.

In HARQ, power is divided based on a target number of times of retransmission. The target number of times of retransmission cited here refers to the number of times of retransmission of traffic required for meeting a power requirement. When the target number of times of retransmission is one as illustrated in FIG. 3 as an example, power for one time of transmission is set high. Therefore, the added power exceeds the required power by transmission of the second traffic. When the target number of times of retransmission is three as illustrated in FIG. 3, power for one time of transmission is set low. Therefore, the added power exceeds the required power by transmission of the fourth traffic.

To maximize the effect of HARQ, in general, it is advisable to increase the target number of times of retransmission. In HARQ, MCS (Modulation and Coding Scheme) is selected so that the required power is exceeded at the target number of times of retransmission.

In HARQ, as mentioned above, the probability that transmission will succeed (cumulative success probability) is enhanced as the target number of times of retransmission is increased. When the target number of times of retransmission is large, transmission may succeed before the original target number of times of retransmission is not reached (early termination).

However, when the target number of times of retransmission is three as illustrated in FIG. 3 as an example, there is a problem of lengthened delay time in communication between the transmitting side and the receiving side. Therefore, with respect to traffic on which a strict delay requirement is imposed, the target number of times of retransmission cannot be increased. For this reason, the following measure is taken in cellular radio communications systems using the existing CDMA to reduce the target number of times of retransmission: high power is set for traffic on which a strict delay requirement is imposed.

When high power is set for retransmission traffic, however, a problem arises. As illustrated in the case where the target number of times of retransmission is one illustrated in FIG. 3, power added by retransmission largely exceeds a required power and the power becomes excessive.

In HARQ, the retransmitted packet is a packet used for reducing an error rate. Therefore, the reception quality of retransmitted packets received on the mobile station side may be lower than the reception quality of the initially transmitted packet. For this reason, with respect to the cellular radio communications system using the existing CDMA, it is proposed to reduce the power of retransmitted packets. (Refer to JP-A-2004-173017, for example.) In JP-A-2004-173017, there is the following description: "In the IR-type HARQ, the second and following packet transmissions are auxiliary and do not require large power; therefore, power for the second and following times is reduced before transmission."

SUMMARY OF THE INVENTION

To enhance the throughput of an entire radio communications system, it is effective to keep from transmitting unnecessarily high power. However, reducing power leads to a problem of the reduced radius of a cell or reduced communication speed. Therefore, it is required to suppress only excessive power.

According to the technology described in JP-A-2004-173017 mentioned above, a base station of a cellular radio communications system using CDMA is capable of suppressing the excessive power of retransmission traffic. However, the base station of the cellular radio communications system using CDMA takes only the interference power in its own cell into account and does not carry out power control with any other cell taken into account. For this reason, it can be thought that the technology is not effective in reducing intercell interference power supplied to other cells.

In a cellular radio communications system using the next-generation OFDMA, it is indispensable to take into account the interference power between the cell of a relevant base station and the cell of an adjacent base station. This is because it is required to reduce intercell interference power to enhance the connection environment at each cell edge. To meet this requirement, a base station must carry out power control in its own cell with interference power to neighbor base stations taken into account to enhance the effect of the reduction of intercell interference power. According to the method described in JP-A-2004-173017, however, it is impossible to suppress the excessive power of retransmission traffic without varying the magnitude of interference power to adjacent cells.

The invention has been made in consideration of the above problems. It is an object of the invention to provide a radio communications system wherein excessive power can be suppressed by setting beforehand FFR with retransmission taken into account and a scheduler carrying out resource allocation, not by instantaneous power control.

The following is a brief description of the gist of a representative example of the invention: the invention is a method for radio resource control carried out in a radio communications system including multiple base stations. The invention is characterized in that: a radio resource that can be used by the base stations is divided into multiple first radio resources on a frequency axis; one or more of the first radio resources are allocated to a second radio resource for initially transmitting a packet; and the other first radio resources are allocated to a third radio resource for retransmitting the packet.

According to an embodiment of the invention, the throughput of a system can be enhanced by suppressing the excessive power of retransmission traffic.

DETAILED DESCRIPTION OF THE PREFERRED EMBODIMENT

Hereafter, description will be given to an embodiment of the invention with reference to the drawings. This embodiment is an embodiment of the invention and the invention is not limited to this embodiment.

Figure 1:
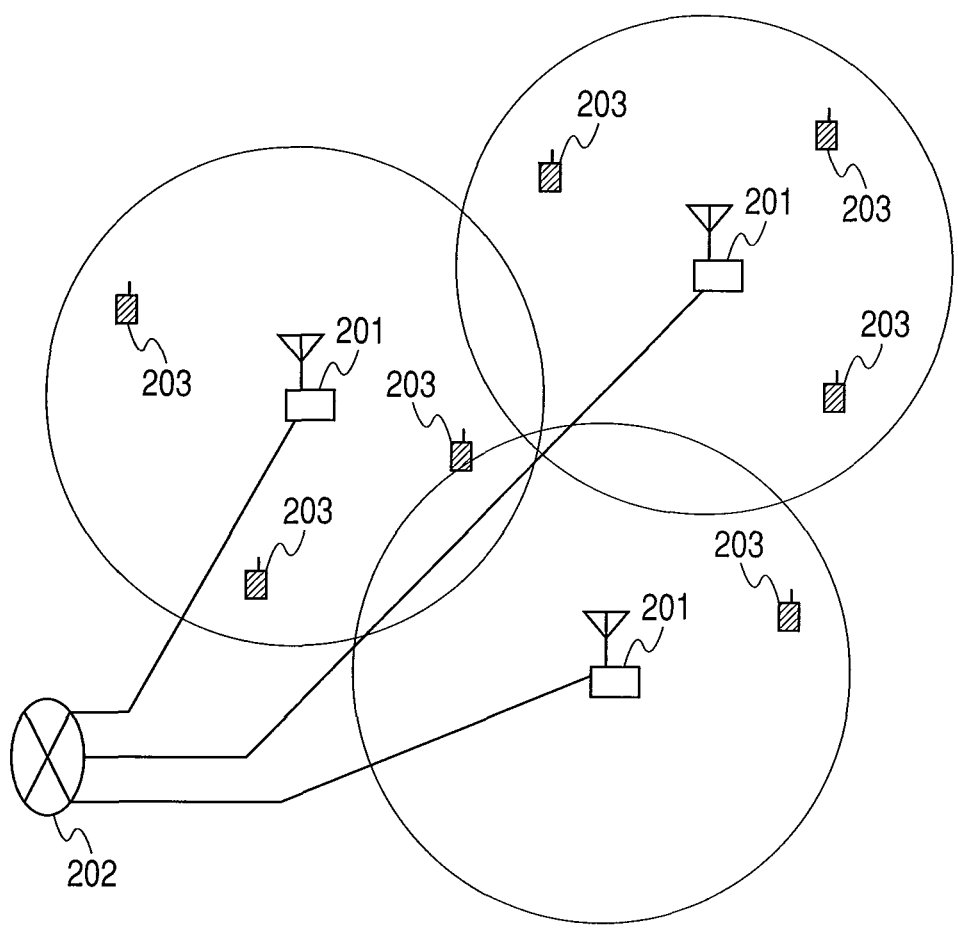
FIG. 1 is an explanatory drawing illustrating the configuration of a cellular radio communications system in an embodiment of the invention.

FIG. 1 is an explanatory drawing illustrating the configuration of a cellular radio communications system in this embodiment of the invention.

The cellular radio communications system in this embodiment includes multiple base stations 201. The base stations 201 are connected with one another through a network 202. Each base station 201 communicates with mobile stations 203 contained in the cell of the base station. Each base station 201 connects a mobile station 203 contained in the base station and a mobile station 203 contained in another base station 201 through the network 202. The base stations are classified into macrocell, picocell, and femtocell base stations depending on the size and functions of a cell in which communication service is provided. For example, the base station 201 of the cellular radio communications system in this embodiment is a macrocell base station. The macrocell base station contains mobile stations 203 (mobile terminals and the like) embraced in its cell, hundreds to thousands of meters in radius.

Figure 4:
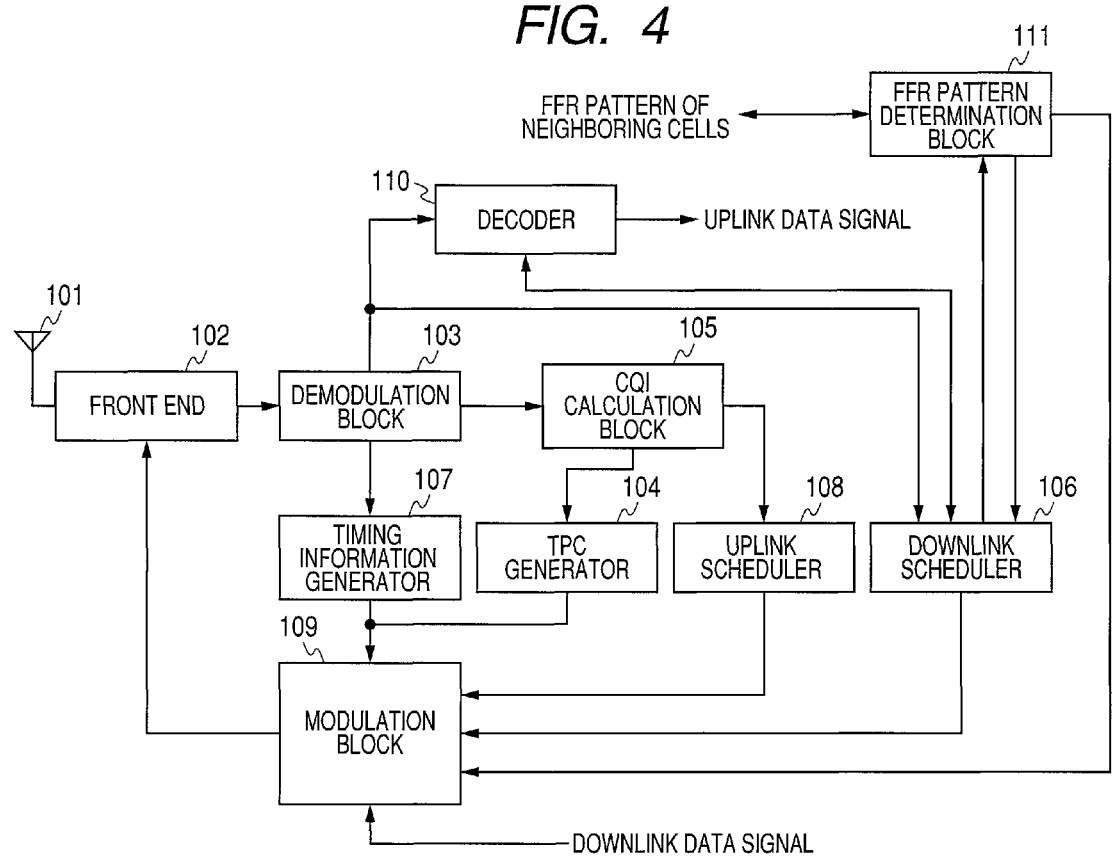
FIG. 4 is a block diagram illustrating the configuration of the radio transmission/reception unit of a base station of a cellular radio communications system in an embodiment of the invention.

FIG. 4 is a block diagram illustrating the configuration of the radio transmission/reception unit of a base station of a cellular radio communications system in the embodiment of the invention.

The radio transmission/reception unit of the base station 201 of the cellular radio communications system in this embodiment includes: an antenna 101, a front end 102, a radio signal demodulation block 103, a TPC (Transmit Power Control) generator 104, a CQI (Channel Quality Indicator) calculation block 105, a downlink data signal allocation scheduler 106, a timing information generator 107, an uplink data signal allocation scheduler 108, a radio signal modulation block 109, a decoder 110, and an FFR pattern determination block 111.

The front end 102 is connected to the antenna 101, radio signal demodulation block 103, and radio signal modulation block 109. The front end 102 filters an RF (Radio Frequency) signal received through the antenna 101 and frequency converts the filtered RF signal and thereby converts it into an uplink baseband OFDM signal. Then it outputs the uplink baseband OFDM signal obtained by this conversion to the radio signal demodulation block 103. Further, the front end 102 converts a downlink baseband OFDM signal inputted from the radio signal modulation block 109 into an RF signal and amplifies the power of the RF signal obtained by this conversion and outputs it to the antenna 101.

The radio signal demodulation block 103 is connected to the decoder 110, timing information generator 107, and CQI calculation block 105. The radio signal demodulation block 103 demodulates an uplink baseband OFDM signal inputted from the front end 102 into a data bit string. Then it outputs the data bit string (signal transmitted from each mobile station 203) obtained by this demodulation to the decoder 110. The radio signal demodulation block 103 detects downlink signal quality information from the data bit string obtained by the demodulation and outputs the detected downlink signal quality information to the downlink data signal allocation scheduler 106. Further, the radio signal demodulation block 103 extracts a pilot signal as a reference signal for demodulating uplink signals from the data bit string obtained by the demodulation. Then it outputs the extracted pilot signal to the timing information generator 107 and the CQI calculation block 105.

The timing information generator 107 detects time deviation of a signal based on the pilot signal inputted from the radio signal demodulation block 103. It generates control information for correcting the detected time deviation and outputs the generated control information to the radio signal modulation block 109.

The CQI calculation block 105 is connected to the TPC generator 104 and the uplink data signal allocation scheduler 108. When the uplink pilot signal is inputted from the radio signal demodulation block 103, the CQI calculation block 105 generates uplink channel quality information. Then it outputs the generated uplink channel quality information (CQI) to the TPC generator 104 and the uplink data signal allocation scheduler 108.

When the uplink channel quality information (CQI) is inputted from the CQI calculation block 105, the TPC generator 104 generates power control information for bringing the uplink channel quality close to a target channel quality. Then it outputs the generated power control information to the radio signal modulation block 109.

When the uplink channel quality information (CQI) is inputted from the CQI calculation block 105, the uplink data signal allocation scheduler 108 determines the following: a combination (MCS: Modulation and Coding Scheme) of a modulation scheme and a coding scheme and allocation of channel resource (segments of frequency and time) with which each mobile station 203 can ensure a certain error rate characteristic. Then it sets up resource allocation information, which is an assembly of the determined MCS and channel resource allocation and outputs the set up resource allocation information to the radio signal modulation block 109. Further, the uplink data signal allocation scheduler 108 holds the uplink resource allocation information.

The MCS is used to determine communication speed (in other words, modulation scheme and coding scheme) according to the communication environment of each mobile station 203. The communication speed is increased with increase in the grade of MCS. A high-grade MCS is used when the environment of communication between a base station 201 and a mobile station 203 is favorable.

The decoder 110 decodes a data bit string (uplink signal transmitted from each mobile station 203) inputted from the radio signal demodulation block 103. Then it transfers the decoded data bit string (uplink data signal) to a control unit (not shown) in a higher order than the base station 201. Further, the decoder 110 decodes an uplink control signal containing ACK/NAK information indicating whether or not a downlink data signal transmitted to each mobile station 203 by the base station 201 has been properly received. When NAK indicating that a downlink data signal has not been properly received is detected from a decoded uplink control signal, the decoder 110 carries out the following processing: it outputs a retransmission request signal requesting to retransmit the downlink data signal that has not been properly received to the downlink data signal allocation scheduler 106.

The FFR pattern determination block 111 carries out the following processing based on FFR allocation information of an adjacent base station inputted through the network 202, or a measurement report from mobile stations 203: it determines a frequency band (FFR allocation information) for which high power is to be set so that the frequency band of the relevant base station and the frequency band of the adjacent base station do not overlap with each other.

Description will be given of a method by which a base station notifies an adjacent base station of a frequency band for which high power is set. For example, a base station notifies an adjacent base station of a threshold value of power and a flag indicating whether or not power lower than the threshold value is guaranteed in each frequency band. In this case, the base station notifies a threshold value of power and the flag guaranteeing low power at several times and updates the threshold value each time. As a result, the base station can control threshold value and flag management.

The FFR pattern determination block 111 outputs the determined FFR allocation information to the downlink data signal allocation scheduler 106. In addition, the FFR pattern determination block 111 outputs the FFR allocation information to the radio signal modulation block 109.

Detailed description will be given later of processing by the FFR pattern determination block 111 with reference to FIG. 5.

When the downlink channel quality information is inputted from the radio signal demodulation block 103, the downlink data signal allocation scheduler 106 carries out the following processing: it determines MCS and channel resource allocation with which a certain error rate characteristic is ensured; and it sets downlink resource allocation information which is an assembly of the determined MCS and channel resource allocation and outputs the set downlink resource allocation information to the radio signal modulation block 109.

In this case, the downlink data signal allocation scheduler 106 uses a retransmission request signal inputted from the decoder 110 as an index of algorithm for determining downlink resource allocation. Further, to set scheduling for reducing interference between the cell of the relevant base station and the cell of an adjacent base station, it utilizes FFR allocation information. For this reason, FFR allocation information outputted from the FFR pattern determination block 111 is inputted to the downlink data signal allocation scheduler 106.

In general, downlink pilot signals transmitted from a base station 201 are information announced to all the mobile stations. Therefore, a frequency band and power density need not be allocated to downlink pilot signals based on FFR allocation information. Meanwhile, a frequency band is allocated to data signals transmitted from each base station 201 based on FFR allocation information.

The downlink data signal allocation scheduler 106 sets a frequency allocation schedule based on the following: downlink channel quality information outputted from the radio signal demodulation block 103 and FFR allocation information outputted from the FFR pattern determination block 111. Then it allocates frequency bands for which powers different in magnitude are set to the individual data signals based on the set frequency allocation schedule.

When FFR allocation information is inputted, specifically, the downlink data signal allocation scheduler 106 preferentially allocates a frequency band in which transmission is carried out with high power to a mobile station 203 (cell edge user) positioned at a cell edge. Thus the FFR allocation information is utilized as an index of algorithm for determining downlink resource allocation.

Detailed description will be given later to processing by the downlink data signal allocation scheduler 106 with reference to FIG. 7.

The radio signal modulation block 109 is connected to the timing information generator 107, FFR pattern determination block 111, TPC generator 104, downlink data signal allocation scheduler 106, and uplink data signal allocation scheduler 108. The radio signal modulation block 109 multiplexes the following signals: a downlink data signal outputted from the control unit (not shown) of the base station 201 and respective control signals outputted from the timing information generator 107, TPC generator 104, downlink data signal allocation scheduler 106, and uplink data signal allocation scheduler 108. The radio signal modulation block 109 thereby generates a downlink baseband OFDM signal and outputs the generated downlink baseband OFDM signal to the front end 102. In this case the downlink data signal and the control signals are respectively time division multiplexed on one frequency channel or frequency division multiplexed on respective predetermined frequency channels.

Further, the radio signal modulation block 109 outputs information on power used for each frequency band to the front end 102 based on FFR allocation information inputted from the FFR pattern determination block 111. At this time, the front end 102 sets power to be transmitted based on the FFR allocation information inputted to the radio signal modulation block 109.

Figure 5:
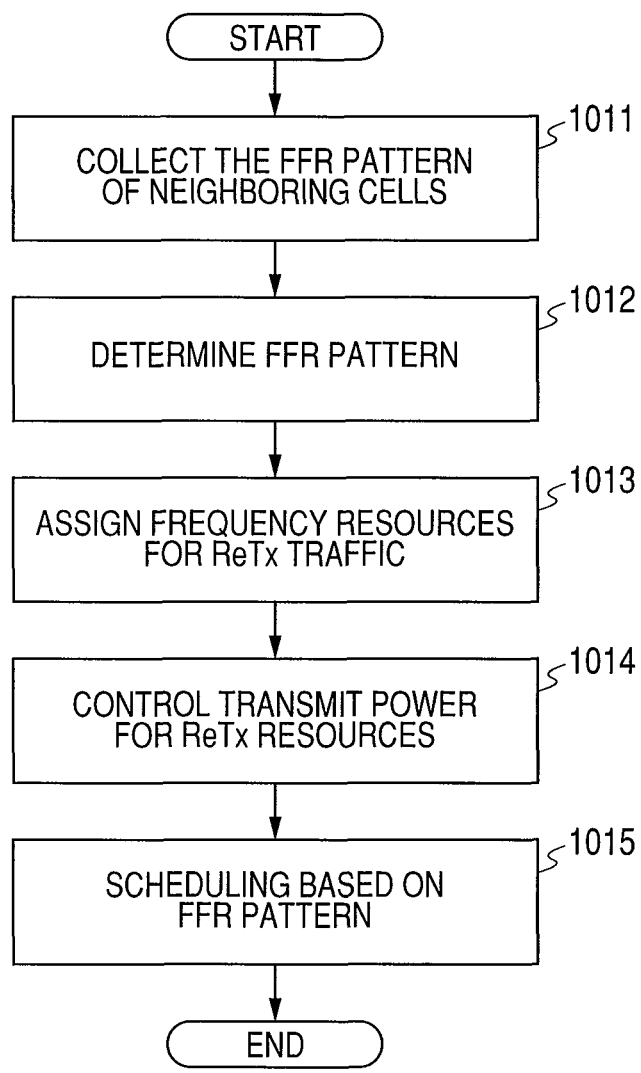
FIG. 5 is a flowchart illustrating processing by the radio transmission/reception unit of a base station of a cellular radio communications system in an embodiment of the invention.

FIG. 5 is a flowchart illustrating processing by the radio transmission/reception unit of a base station of a cellular radio communications system in the embodiment of the invention.

Step 1011 and Step 1012 are processing for determining a cell cyclic frequency with which high power can be transmitted and carried out by the FFR pattern determination block 111. Step 1013 and Step 1014 are processing for determining a frequency band for retransmission in which low power is transmitted and carried out by the FFR pattern determination block 111. Step 1015 is processing for setting a frequency band allocation schedule and carried out by the downlink data signal allocation scheduler 106.

Figure 2A:
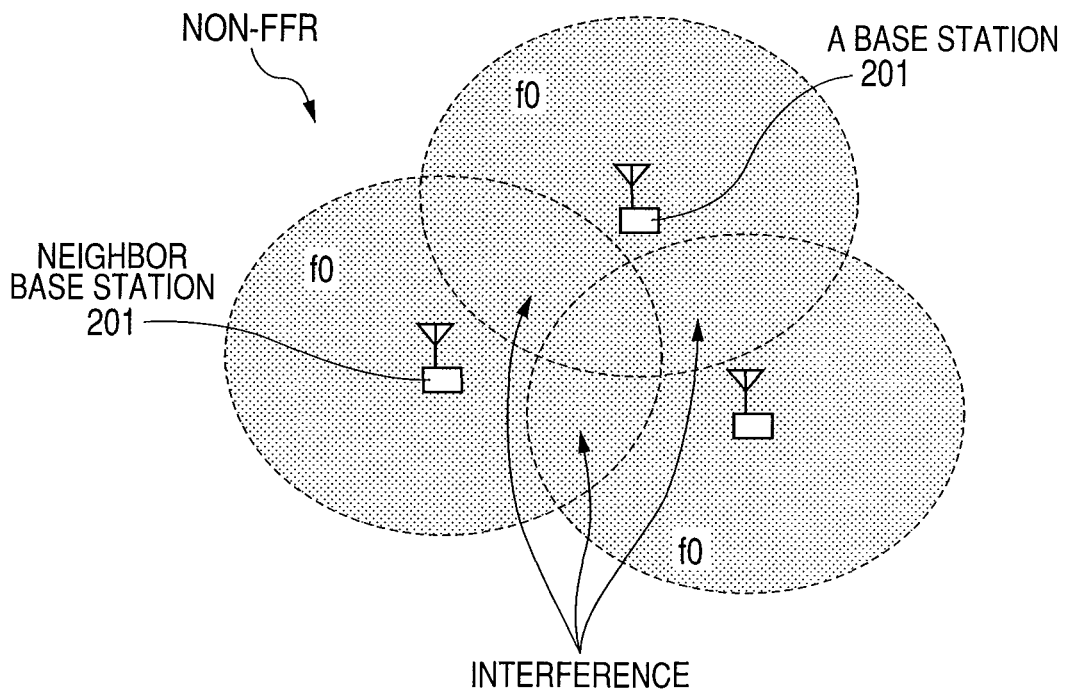
FIG. 2A is an explanatory drawing illustrating an overview of a conventional non-FFR cellular radio communications system.
Figure 2B:
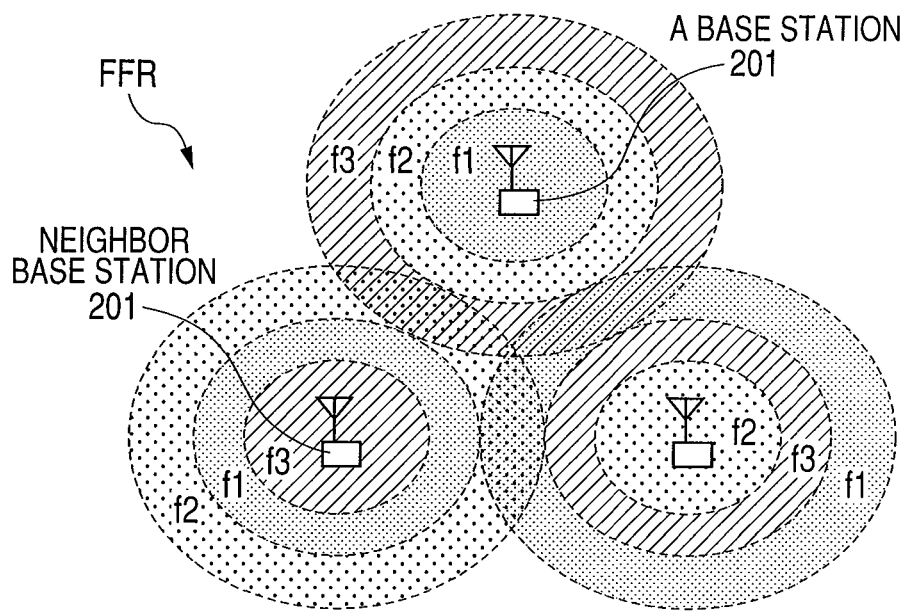
FIG. 2B is an explanatory drawing illustrating an overview of a conventional FFR cellular radio communications system.
Figure 2C:
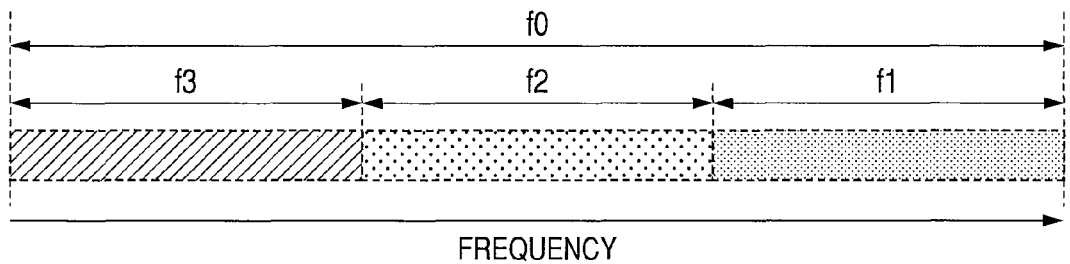
FIG. 2C is an explanatory drawing illustrating frequency bands in conventional FFR.
Figure 3:
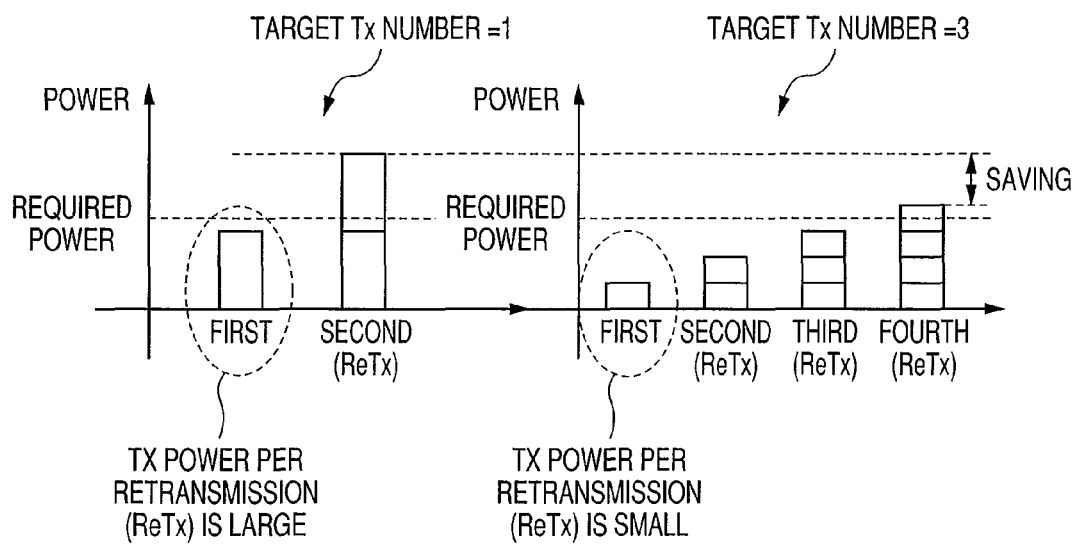
FIG. 3 is an explanatory drawing illustrating an overview of conventional HARQ.

First, the FFR pattern determination block 111 acquires the following information through an interface (not shown) for connection to the network 202 to carry out FFR allocation: the FFR allocation information of another base station 201 adjoining to the relevant base station from the adjacent base station or OMT (Operation and Maintenance Terminal) managing base stations 201 (Step 1011). Subsequently, the FFR pattern determination block 111 divides the frequency band (f0) into multiple frequency bands (for example, f1, f2, f3) on the frequency axis based on the acquired FFR allocation information as illustrated in FIG. 2C as an example. Then the FFR pattern determination block 111 determines a frequency band for which high power is set among the divided frequency bands (for example, f1, f2, f3) based on the acquired FFR allocation information (Step 1012).

More specific description will be given. For example, when a frequency band f2 for which high power is set is allocated to a mobile station 203 positioned at the cell edge of an adjacent base station 201 as illustrated in FIG. 2B, the following processing is carried out: the FFR pattern determination block 111 allocates a frequency band f3 for which high power is set to a mobile station 203 positioned at the cell edge of the base station 201. Therefore, the mobile station 203 positioned at the cell edge of the base station 201 receives radio signals in the frequency band f3 from the base station 201. Consequently, it is less prone to receive the interference power of a radio signal in the frequency band f2 transmitted from the adjacent base station 201.

Subsequently, the FFR pattern determination block 111 subdivides the frequency bands divided at Step 1012 into multiple frequency bands on the frequency axis. Further, it sets one or more of the subdivided frequency bands as a frequency band for initial transmission traffic (frequency band for initial transmission) and some of the other subdivided frequency bands as a frequency band for retransmission traffic (frequency band for retransmission) (Step 1013). Subsequently, the FFR pattern determination block 111 sets low power for the frequency band for retransmission (Step 1014).

Figure 6A:
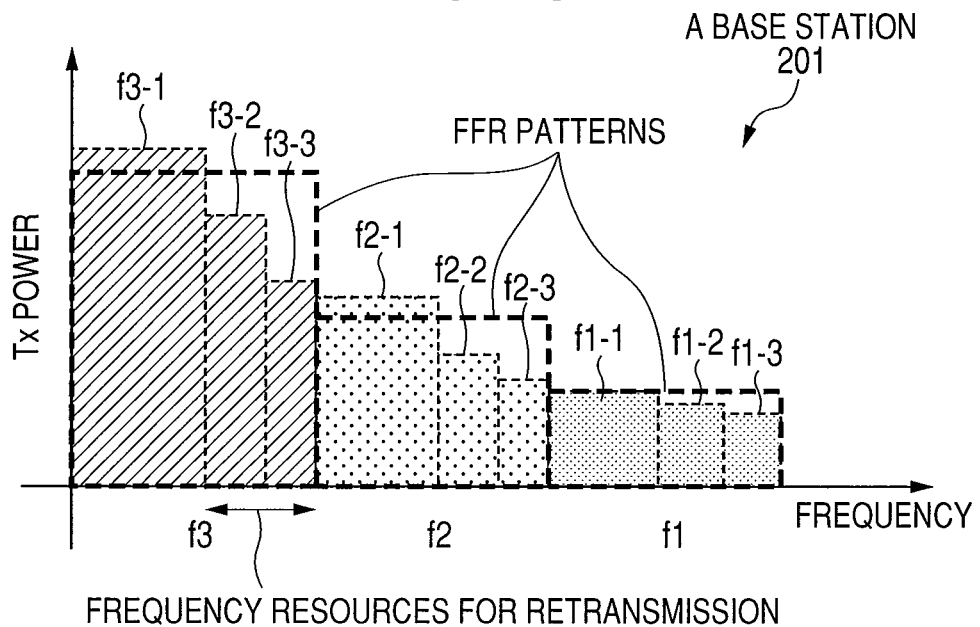
FIG. 6A is an explanatory drawing illustrating an example of an FFR allocation pattern set by an FFR pattern determination block in an embodiment of the invention.

This is intended to suppress the power of retransmission traffic that significantly exceeds a required power. The foregoing is also intended to divide frequencies into frequency for initial transmission and frequency for retransmission. The frequency for retransmission is allocated to retransmission traffic. The FFR pattern determination block 111 may respectively set powers varied stepwise in magnitude for the frequency bands for retransmission. The correspondence between set frequencies and powers is, for example, as follows:

FIG. 6A is an explanatory drawing illustrating an example of an FFR allocation pattern set by the FFR pattern determination block 111 in the embodiment of the invention.

The FFR allocation pattern of the base station 201 is determined by the FFR pattern determination block 111 based on the FFR allocation information of an adjacent base station 201 (Step 1012 in FIG. 5).

The frequency bands f1, f2, and f3 are frequency resources divided on the frequency axis by the FFR pattern determination block 111. Power is set for each of the frequency bands f1, f2, and f3 by the FFR pattern determination block 111 (Step 1012 in FIG. 5). For example, the highest power is set for the frequency band f3. The highest power next to that for the frequency band f3 is set for the frequency band f2. The lowest power is set for the frequency band f1.

The frequency bands f1, f2, and f3 are subdivided into multiple frequency bands by the FFR pattern determination block 111 (Step 1013 in FIG. 5). For example, the frequency band f3 includes frequency bands f3-1, f3-2, and f3-3. Similarly, the frequency bands f1 and f2 also respectively include multiple subdivided frequency resources.

Of the subdivided frequency bands (f3-1, f3-2, and f3-3), for example, the frequency band f3-1 is a frequency band for initial transmission. The frequency bands f3-2 and f3-3 are frequency bands for retransmission (Step 1013 in FIG. 5). Stepwise reduced power is set for each frequency band (f3-1, f3-2, and f3-3). For example, the highest power is set for the frequency band f3-1 for initial transmission. Power lower than that for the frequency band f3-1 is set for the frequency bands f3-2 and f3-3.

Power further lower than that for the frequency band f3-2 for the first retransmission traffic may be set for the frequency band f3-3 for the second retransmission traffic (Step 1014 in FIG. 5). The power for the frequency band for initial transmission (for example, the frequency band f3-1) may be increased according to the amount of reduction of the power for the frequency bands for retransmission (for example, the frequency bands f3-2 and f3-3). The sum of the power for the frequency band for initial transmission (f3-1) and the power for the frequency bands for retransmission (f3-2 and f3-3) is set lower than the power allocated to the frequency band f3.

Figure 6B:
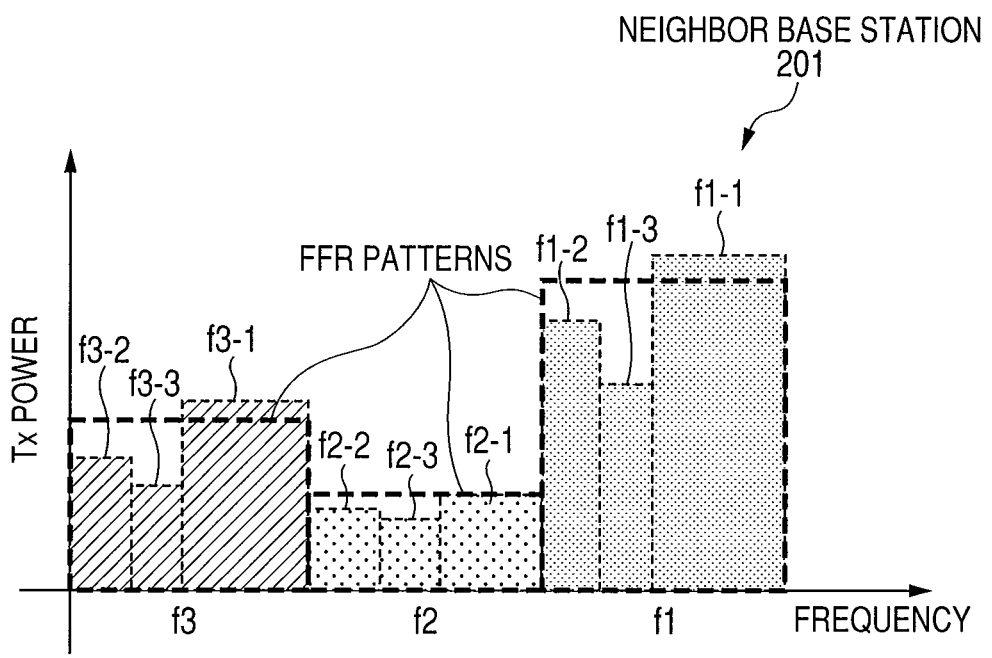
FIG. 6B is an explanatory drawing illustrating an example of an FFR allocation pattern set by an FFR pattern determination block in an embodiment of the invention.

FIG. 6B is an explanatory drawing illustrating an example of an FFR allocation pattern set by the FFR pattern determination block 111 in the embodiment of the invention.

The FFR allocation pattern illustrated in FIG. 6B is the FFR allocation pattern of an adjacent base station 201. The FFR allocation pattern illustrated in FIG. 6B is different from the FFR allocation pattern illustrated in FIG. 6A in the combination of each divided frequency band (f1, f2, and f3) and the magnitude of power set for each frequency band.

Similarly with the setting of the FFR allocation pattern illustrated in FIG. 6A, the frequency bands for initial transmission (f1-1, f2-1, and f3-1) and the frequency bands for retransmission (for example, f1-2 and f1-3) are also so set that overlapping of high-power frequency bands is minimized. Unlike the ordinary FFR pattern (f1, f2, and f3); however, overlapping of the subdivided frequency bands named as the same between adjoining base stations is permitted. For example, the frequency bands f1-1 in FIG. 6A and the frequency band f1-1 in FIG. 6B are allowed to be overlapped, because the bandwidth is related to the probability of success in decoding at initial transmission.

A concrete setting method is as described below. First, each of the FFR patterns in which the frequency is cycled three times (f1, f2 and f3, reuse factor=3) illustrated in FIG. 2B is subdivided into three. One of the divided frequency bands is set as the frequency band for initial transmission. Subsequently, the bandwidth of the set frequency bands for initial transmission (f1-1, f2-1, and f3-1) is exchanged between base stations. In the other cells, the frequency band for initial transmission for the other cells is set from the frequency bands excluding the exchanged bandwidth of the frequency bands for initial transmission (f1-1, f2-1, and f3-1).

Description will be back to FIG. 5.

The magnitude of power set for frequency bands for retransmission (for example, the frequency bands f3-2 and f3-3 in FIG. 6A) by the FFR pattern determination block 111 at Step 1014 relates to a target number of times of retransmission. The magnitude of power for a frequency band for retransmission may be set based on the amount of reduction relative to power set for the frequency band for initial transmission (for example, the frequency band f3-1 in FIG. 6A).

The target number of times of retransmission for traffic differs depending on the type of traffic (for example, voice telephone call, video delivery, or the like) included in the cell of each base station 201. When there is statistically much traffic with a low target number of times of retransmission (that is, traffic on which a strict delay requirement is imposed), the FFR pattern determination block 111 may take the following measure: it may increase the amount of reduction of power for frequency bands for retransmission relative to the power for the frequency band for initial transmission. Conversely, when there is statistically much traffic with a large target number of times of retransmission (that is, best-effort traffic on which a lenient delay requirement is imposed), the FFR pattern determination block 111 may take the following measure: it may reduce the amount of reduction of power for frequency bands for retransmission relative to power for the frequency band for initial transmission.

The FFR pattern determination block 111 may vary not only the amount of reduction of power but also the bandwidth of frequency bands for retransmission set at Step 1013 based on the target number of times of retransmission. Specifically, when there is statistically much traffic with a small target number of times of retransmission, the FFR pattern determination block 111 may widen the bandwidth of frequency bands for retransmission. When there is statistically a little traffic with a small target number of times of retransmission, it may narrow the bandwidth of frequency bands for retransmission.

As mentioned above, the cellular radio communications system in this embodiment determines the following by the FFR pattern determination block 111 based on the statistical traffic information of the area of each base station: the amount of reduction of power for frequency bands for retransmission and the bandwidth of those frequency bands. An administrator of the cellular radio communications system may set the power and bandwidth of frequency bands for retransmission based on the number of mobile stations 203 contained in each base station 201 and the statistical traffic information of the area of each base station.

As described up to this point, the processing of Step 1011 to Step 1014 is carried out by the FFR pattern determination block 111. The processing of Step 1011 to Step 1014 is carried out when a base station is newly installed or when any change in the communication environment is detected.

Description will be given to processing by the downlink data signal allocation scheduler 106.

Since traffic with a small target number of times of retransmission is high in power for one time of transmission, it is required to increase the amount of reduction of the power of retransmission traffic. For this reason, the following measure is taken. It is determined whether or not the target number of times of retransmission is higher than a predetermined threshold value. When it is determined that the target number is not higher than the predetermined threshold value, the downlink data signal allocation scheduler 106 carries out the following processing: it carries out scheduling so as to allocate retransmission traffic to the frequency band for retransmission set by the FFR pattern determination block 111 at Step 1012 (Step 1015).

The downlink data signal allocation scheduler 106 may allocate the above-mentioned frequency band for retransmission to other than retransmission traffic. For example, when the number of connected mobile stations 203 is large and the frequency band for retransmission is limited to retransmission traffic, the throughput of the entire radio communications system is degraded. In this case, the downlink data signal allocation scheduler 106 may allocate the frequency band for retransmission to initial transmission traffic. As a result, the throughput of the radio communications system is enhanced. Detailed description will be given to processing by the downlink data signal allocation scheduler 106.

Figure 7:
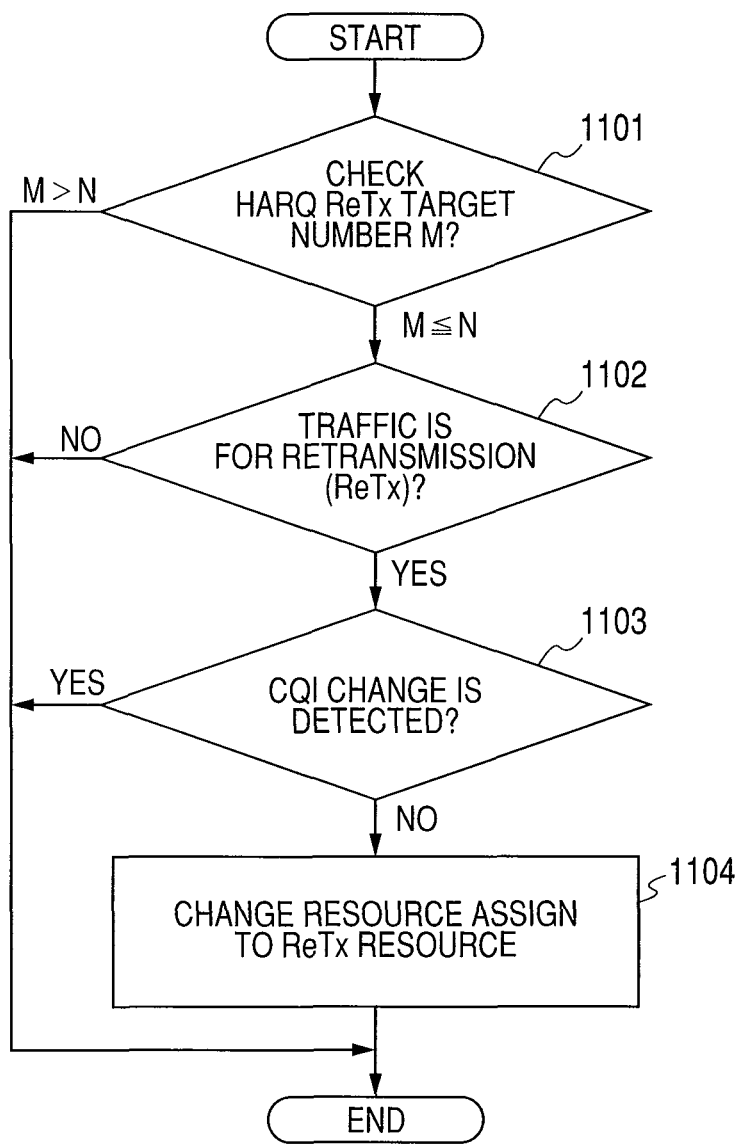
FIG. 7 is a flowchart illustrating processing by a downlink data signal allocation scheduler in an embodiment of the invention.

FIG. 7 is a flowchart illustrating processing by the downlink data signal allocation scheduler 106 of a cellular radio communications system in the embodiment of the invention.

First, the downlink data signal allocation scheduler 106 determines whether or not the target number of times of retransmission of traffic is equal to or lower than a predetermined threshold value (Step 1101). This is because when the target number of times of retransmission is small, retransmission traffic must be transmitted in a frequency band for which lower power is set so that excessive power is not produced.

When it is determined at Step 1101 that the target number of times of retransmission is not equal to or lower than the predetermined threshold value, the possibility that excessive power will be produced is low. Therefore, the downlink data signal allocation scheduler 106 terminates this series of processing. Meanwhile, when it is determined at Step 1101 that the target number of times of retransmission is equal to or lower than the predetermined threshold value, the downlink data signal allocation scheduler 106 determines whether or not the traffic is retransmission traffic (Step 1102).

When it is determined at Step 1102 that the traffic is not retransmission traffic, that is, the traffic is the initial transmission traffic, the downlink data signal allocation scheduler 106 terminates this series of processing. Meanwhile, when it is determined at Step 1102 that the traffic is retransmission traffic, the downlink data signal allocation scheduler 106 determines whether or not the communication environment has been changed between the initial transmission and the current transmission (Step 1103). The downlink data signal allocation scheduler 106 may determine that the communication environment has been changed, for example, in the following cases: cases where the difference between the value of quality (CQI) indicated by downlink channel quality information in the initial transmission and the value of quality (CQI) indicated by downlink channel quality information in retransmission is higher than a predetermined value.

When it is determined at Step 1103 that the communication environment has been changed, the downlink data signal allocation scheduler 106 terminates this series of processing. That is, it does not carry out scheduling for allocating retransmission traffic to a frequency band for which low power is set. This is because when the communication environment is deteriorated, there is a high possibility that transmission success (ACK) will not result even though retransmission traffic is retransmitted more than once in a frequency band for which low power is set.

Meanwhile, when it is determined at Step 1103 that the communication environment has not been changed, the downlink data signal allocation scheduler 106 allocates retransmission traffic to a frequency band for which low power is set (Step 1104). However, when the allocation algorithm of the scheduler takes an instantaneous communication environment into account, the processing of Step 1103 may be omitted. This is because when the communication environment has been deteriorated, frequency resource allocation is not carried out and there is not influence thereof.

To determine a frequency band to be allocated to each mobile station 203, the downlink data signal allocation scheduler 106 uses a cost function. The cost function cited here is a function for calculating the value of the cost of unprocessed traffic used in an algorithm of common scheduling such as PF (Proportional Fairness). The policy of the scheduler (algorithm of scheduling) is defined by the cost function.

The downlink data signal allocation scheduler 106 allocates frequency resources to traffic in the descending order of the value of cost calculated by the cost function. The downlink data signal allocation scheduler 106 controls the cost function so that retransmission traffic is allocated to a low-power frequency band for retransmission. Preferential allocation of frequency resources is achieved, for example, by giving an offset to the cost function of retransmission traffic only when a frequency band for retransmission is allocated. Or, two-stage scheduling can be carried out. In this scheduling, frequency resources are allocated to initial transmission traffic in the order of cost function in the frequency band for initial transmission; thereafter, resources are allocated to retransmission traffic in the frequency bands for retransmission.

The base station 201 can suppress the excessive power of retransmission traffic to a mobile station 203 by this downlink data signal allocation scheduler 106. As a result, interference power can be minimized.

According to this embodiment, as described up to this point, HARQ can be carried out with required minimum power. Further, the throughput of a system can be enhanced by suppressing the excessive power of retransmission traffic. Further, since power is set beforehand by FFR, it is possible to minimize and make constant interference power between a relevant cell and an adjacent cell.

What is claimed is:

1. A method for radio resource control carried out in a radio communications system including a plurality of base stations, the method comprising the steps of:

subdividing a radio resource that can be used by the base stations into a plurality of first radio resources on the frequency axis, allocating a first set of one or more of the first radio resources to a second radio resource for initially transmitting a packet, and allocating a second set of first radio resources other than the first set of first radio resources to a third radio resource for retransmitting the packet, wherein a transmission power of the third radio resource is set to be smaller than the transmission power of the second radio resource, wherein the second and third radio resources of a first base station are set to bet different from the second and third radio resources of an adjacent second base station, wherein the third radio resource includes a fourth radio resource for retransmitting the packet for a first time and a fifth radio resource for retransmitting the packet for a second time, wherein the transmission power of the fourth radio resource is set to be smaller than the transmission power of the second radio resource, wherein the transmission power of the fifth radio resource is set to be smaller than the transmission power of the fourth radio resource, and wherein the fourth and fifth radio resources of the first base station are set to be different from the fourth and fifth radio resources of the adjacent second base station.

2. The method for radio resource control according to claim 1;
wherein the third radio resource is allocated to traffic having a target number of times of retransmission that is smaller than a predetermined threshold value.

3. The method for radio resource control according to claim 1,
wherein when traffic having a target number of times of retransmission that is smaller than a predetermined threshold value is retransmitted, the third radio resource is allocated to a mobile station.

4. The method for radio resource control according to claim 1,
wherein when a difference between a communication quality of a packet transmitted to a mobile station in initial transmission and the communication quality thereof in retransmission is smaller than a predetermined threshold value, the third radio resource is allocated to the mobile station.

5. The method for radio resource control according to claim 1,
wherein the transmission power of a first radio resource allocated to a mobile station positioned in proximity to the boundary of the cell formed by the base station is set to a value higher than the transmission power of the first radio resource allocated to a mobile station that is not positioned in proximity to the boundary of the cell.

6. A base station transmitting a packet to a mobile station using allocated radio resources, the base station comprising:
an antenna; and
a front end that filters a RF (Radio Frequency) signal received through the antenna and convert the signal into an uplink baseband OFDM (Orthogonal Frequency Division Multiplexing) signal, wherein a radio resource that can be used by the same base station is subdivided into a plurality of first radio resources on the frequency axis, wherein a first set of one or more of the first radio resources is allocated to a second radio resource for initially transmitting a packet, wherein a second set of first radio resources other than the first set of first radio resources is allocated to a third radio resource for retransmitting the packet, wherein a transmission power of the third radio resource is set to be smaller than the transmission power of the second radio resource, wherein the second and third radio resources of the base station are set to be different from the second and third radio resources of an adjacent base station, wherein the third radio resource includes a fourth radio resource for retransmitting the packet for a first time and a fifth radio resource for retransmitting the packet for a second time, and wherein the base station sets:
the transmission power of the fourth radio resource to be smaller than the transmission power of the second radio resource,
the transmission power of the first radio resource to be smaller than the transmission power of the fourth radio resource, and
wherein the fourth and fifth radio resources of the base station are set to be different from the fourth and fifth radio resources of the adjacent base station.

7. The base station according to claim 6,
wherein the third radio resource is allocated to traffic having a target number of times of retransmission that is smaller than a predetermined threshold value.

8. The base station according to claim 6,
wherein when traffic having a target number of times of retransmission smaller than a predetermined threshold value is retransmitted, the third radio resource is allocated to a mobile station.

9. The base station according to claim 6,
wherein when a difference between a communication quality of a packet transmitted to a mobile station in initial transmission and the communication quality thereof in retransmission is smaller than a predetermined threshold value, the third radio resource is allocated to the mobile station.

10. The base station according to claim 6,
wherein the transmission power of a first radio resource allocated to a mobile station positioned in proximity to the boundary of the cell formed by the base station is set to a value higher than the transmission power of the first radio resource allocated to a mobile station that is not positioned in proximity to the boundary of the cell.

* * * * *